(12) United States Patent
Shah et al.

(10) Patent No.: US 8,073,968 B1
(45) Date of Patent: Dec. 6, 2011

(54) METHOD AND APPARATUS FOR AUTOMATICALLY OPTIMIZING ROUTING OPERATIONS AT THE EDGE OF A NETWORK

(75) Inventors: Pritam Shah, Milpitas, CA (US); Vamsidhar Valluri, Milpitas, CA (US); Dana Blair, Atlanta, GA (US); Philip C. Jacobs, Boxborough, MA (US); Kathleen Nguyen, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 1497 days.

(21) Appl. No.: 10/980,550

(22) Filed: Nov. 3, 2004

(51) Int. Cl.
*G06F 15/173* (2006.01)
*G06F 15/16* (2006.01)
(52) U.S. Cl. .................. 709/238; 709/232
(58) Field of Classification Search ............ 709/238
See application file for complete search history.

(56) References Cited

U.S. PATENT DOCUMENTS

| | | | |
|---|---|---|---|
| 6,243,667 B1 | 6/2001 | Kerr et al. | |
| 6,292,832 B1 | 9/2001 | Shah et al. | |
| 6,577,725 B1* | 6/2003 | Lee | 379/242 |
| 7,272,643 B1* | 9/2007 | Sarkar et al. | 709/222 |
| 2002/0004836 A1* | 1/2002 | Shah | 709/230 |
| 2002/0010798 A1* | 1/2002 | Ben-Shaul et al. | 709/247 |
| 2003/0065711 A1* | 4/2003 | Acharya et al. | 709/203 |
| 2003/0163729 A1* | 8/2003 | Buchegger | 713/201 |
| 2003/0182445 A1* | 9/2003 | Smith et al. | 709/238 |
| 2004/0028040 A1* | 2/2004 | Kumar et al. | 370/389 |
| 2004/0078485 A1* | 4/2004 | Narayanan | 709/242 |
| 2004/0107295 A1* | 6/2004 | Herkersdorf et al. | 709/242 |
| 2004/0170125 A1* | 9/2004 | O'Neill | 370/230 |
| 2005/0027778 A1* | 2/2005 | Dimitrelis et al. | 709/200 |
| 2005/0041671 A1* | 2/2005 | Ikeda et al. | 370/395.52 |

(Continued)

FOREIGN PATENT DOCUMENTS

WO    WO0079219 A1 * 12/2000

OTHER PUBLICATIONS

Tanenbaum, A., Computer Networks, Fourth Edition, Section 1.4.2, Prentice Hall, 2003, pp. 41-44.

(Continued)

*Primary Examiner* — Jeffrey Pwu
*Assistant Examiner* — Shaq Taha
(74) *Attorney, Agent, or Firm* — Cesari and McKenna, LLP

(57) ABSTRACT

An Optimized Edge Routing (OER) technique provides efficiently data routing at the edge of a network or subnetwork. The technique employs a Master node that manages a set of border nodes located at the edge of the network or subnetwork. The Master node may be a stand-alone network management node or may be incorporated into a network node, such as a border node. Unlike prior implementations, the Master node instructs the border nodes to dynamically acquire ("learn") prefixes of incoming and outgoing data flows and to selectively filter a set of learned address prefixes whose corresponding data flows match a predetermined set of criteria. The criteria may be based on routing metrics other than, or in addition to, conventional cost-based or distance-based metrics. Further, the criteria may include a set of filtering parameters that may be reconfigured, e.g., by the Master node, from time to time. Using the learned prefixes filtered by the border nodes, the Master node can distribute network traffic and utilize network bandwidth more efficiently than conventionally done.

30 Claims, 7 Drawing Sheets

U.S. PATENT DOCUMENTS

| | | | |
|---|---|---|---|
| 2005/0089015 A1* | 4/2005 | Tsuge et al. | 370/351 |
| 2006/0020715 A1* | 1/2006 | Jungck | 709/246 |
| 2007/0100776 A1* | 5/2007 | Shah et al. | 705/400 |
| 2007/0104202 A1* | 5/2007 | Tariq et al. | 370/392 |
| 2008/0037578 A1* | 2/2008 | Carlson et al. | 370/463 |

OTHER PUBLICATIONS

Perlman, Radia, Interconnections Second Edition: Bridges, Routers, Switches, and Internetworking Protocols, Chapter 12: Routing Algorithm Concepts, Addison Wesley, 2000, pp. 299-324.

Perlman, Radia, Interconnections Second Edition: Bridges, Routers, Switches, and Internetworking Protocols, Chapter 9: Network Layer Addresses, Addison Wesley, 2000, pp. 189-220.

Rekhter, Y. et al., RFC 1771, entitled A Border Gateway Protocol 4 (BGP-4), Network Working Group, Mar. 1995, pp. 1-54.

NetFlow by Cisco, NetFlow Services Solutions Guide, Sep. 2002, pp. 1-74.

NetFlow v9 Export Format, Cisco Systems, Inc., 2003, pp. 1-22.

NetFlow Services and Appliations, White Paper, Cisco Systems, Inc., 1999, pp. 1-27.

\* cited by examiner

"TOP TALKER" LEARN AGGREGATION CACHE 410

| PREFIX 412 | FLOW ID 414 | MEASURED THROUGHPUT (BYTES) 416 | FLOW COUNT 418 | OTHER STATISTICS 419 |
|---|---|---|---|---|
| 1.2.3.4 /24 | 1 | 1750 | 17 | |
| 1.2.5.6 /26 | 2 | 600 | 5 | |
| 1.2.5.135/26 | 3 | 55 | 1 | |
| ... | | | | |

"TOP DELAY" LEARN AGGREGATION CACHE 420

| PREFIX 422 | FLOW ID 424 | MEASURED ROUND-TRIP DELAY (sec) 426 | FLOW COUNT 428 | OTHER STATISTICS 429 |
|---|---|---|---|---|
| 1.2.3.4 /24 | 1 | 2.70 | 17 | |
| 1.2.5.6 /26 | 2 | 0.87 | 5 | |
| 1.2.5.135/26 | 3 | 0.05 | 1 | |
| ... | | | | |

FIG. 4

METHOD AND APPARATUS FOR AUTOMATICALLY OPTIMIZING ROUTING OPERATIONS AT THE EDGE OF A NETWORK

FIELD OF THE INVENTION

This invention relates generally to routing data in a computer network, and, more specifically, to an Optimized Edge Routing (OER) technique that optimizes network traffic patterns at the edge of a network based on learned address prefixes.

BACKGROUND OF THE INVENTION

A computer network is a geographically distributed collection of interconnected subnetworks for transporting data between network nodes. A local area network (LAN) is an example of such a subnetwork. The network topology is defined by an arrangement of client nodes that communicate with one another, typically through one or more intermediate network nodes, such as a router or switch. As used herein, a client node is an endstation node that is configured to originate or terminate network communications. In contrast, an intermediate network node is a node that facilitates routing data and messages among the client nodes. Communications between network nodes are typically effected by exchanging discrete packets of data according to predefined protocols. In this context, a protocol consists of a set of rules defining how the nodes interact with each other.

Each data packet typically comprises "payload" data prepended ("encapsulated") by at least one network header formatted in accordance with a network communication protocol. The network headers include information that enables the client nodes and intermediate nodes to efficiently route the packet through the computer network. Often, a packet's network headers include a data-link (layer 2) header, an internetwork (layer 3) header, a transport (layer 4) header and an application (layer 5) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A stream of data packets, or data flow, may be established between a source node and a destination node in a computer network. Packets in the flow originate at the source node and subsequently "hop" from node to node along a logical data path until they reach the destination node. Accordingly, each packet in the flow necessarily stores the same source and destination addresses defining its logical path through the network. In addition, packets in the data flow may contain other common information as well. For instance, each packet in the data flow may store the same values in selected packet-header fields, e.g., in their internetwork, transport and application headers. The selected header fields may store, for example, source or destination port numbers, protocol identifiers, type-of-service (ToS) values, etc. associated with the data flow. Thus, data packets may be classified as belonging to the flow by examining the contents of their selected packet-header fields.

The network addresses defining the logical data path of a data flow are most often stored as Internet Procotol (IP) addresses in the packets' internetwork headers. IP addresses are most typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 256 individual nodes in the subnetwork. For instance, a first node in the subnetwork may be assigned to the IP address 128.0.10.1, whereas a second node may be assigned to the IP address 128.0.10.2.

Although the IPv4 protocol has performed well, the IP Version 6 (IPv6) protocol has been introduced to increase the number of available network addresses and provide additional services at the internetwork layer of the conventional TCP/IP protocol stack. The IPv6 protocol employs a larger address space than its IPv4 predecessor, and utilizes 128 bit (sixteen byte) values to address network nodes. For ease of explanation hereinafter, IP addresses will be described in terms of 32-bit IPv4 addresses, although those skilled in the art will appreciate that the descriptions herein may be equally applied to other address formats, such as IPv6 addresses.

A subnetwork is often associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.*, and the subnetwork contains two addressable (reachable) network nodes. In this case, 24 address bits are needed to identify the subnetwork 128.0.10.*, and an additional address bit is required to distinctly address either of the two nodes in the subnetwork. Thus, the subnetwork may be associated with a subnet mask length of /25 since only the first 25 most-significant bits in an IP address are required to uniquely address either of the subnetwork's reachable nodes (i.e., 24 bits to address the subnetwork plus one bit to address a node in the subnetwork).

As used herein, an "address prefix" is defined as the result of applying a subnet mask to a network address. For example, consider the address prefix 128.0.10.1 /24. In this case, the prefix contains the 24 most-significant bits of the IP address 128.0.10.1, i.e., the prefix equals 0x80000A (hexadecimal). The same address prefix may be represented in other, equivalent ways. For instance, because the address prefix 128.0.10.2 /24 contains the same 24 most-significant bits as the prefix 128.0.10.1 /24, the two prefixes are functionally equivalent. However, a third address prefix having a different subnet mask length, i.e., not equal to /24, will not be equivalent because its subnet mask selects a different number of contiguous high-order address bits. For instance, the address prefix 128.0.10.1 /24 differs from the prefix 128.0.10.1 /25 since the two prefixes contain a different number of high-order address bits, i.e., 24 and 25 bits respectively.

Since management of a large number of subnetworks can prove burdensome, a network may contain smaller groups of one or more subnetworks which may be managed as separate routing domains or autonomous systems (AS). In this context, a routing domain is broadly construed as a collection of interconnected network nodes within a common address space, and an AS is a routing domain managed by a single administrative entity, such as a company, an academic institution, a branch of government, etc. As used herein, an autonomous system is not necessarily associated with a conventional AS number, although it may be. In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined "interior gateway" routing protocols, such as conventional link-state protocols and distance-vector protocols. These interior protocols define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

A plurality of interconnected AS's may be configured to exchange data packets in accordance with a predetermined "external gateway" routing protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. To implement the BGP protocol, each AS includes at least one "border" node through which it communicates with other, interconnected AS's. Because data packets enter and exit the AS through the border node, the border node is said to be located at the "edge" of the AS.

The BGP protocol facilitates policy-based routing in which an administrative entity places restrictions on inter-AS routing operations. For example, the administrator of a company's AS may employ a routing policy where network traffic leaving the AS is not permitted to enter a competitor's network, even if the competitor provides an otherwise acceptable routing path. BGP policies typically do not depend on the cost-based or distance-based routing metrics used with interior gateway protocols. Instead, the policies rely on AS path-vector information. More specifically, the BGP protocol enables a plurality of interconnected AS's to exchange network topology information. Using this topology information, each AS can derive "paths" to the other reachable AS's, each path defining a logical sequence of AS's. For example, a path between an $AS_1$ and an $AS_3$ may be represented by the sequence $\{AS_1, AS_2, AS_3\}$ when only $AS_2$ intervenes. Based on the content of these AS sequences, the BGP protocol may filter those paths that do not coincide with the administrator's policies. As such, inter-AS routing operations are performed using only the "best paths" satisfying the BGP policies.

Because BGP policies are applied to sequences of AS's, the policies are not able to optimize inter-AS routing in other respects, such as optimizing bandwidth utilization or minimizing cost or distance metrics. Furthermore, interior gateway protocols cannot remedy these deficiencies in the BGP protocol because they do not scale well when applied to a large number of network nodes spanning multiple AS's. For instance, the process of exchanging cost-based or distance-based routing metrics among a large number of network nodes would not only consume an unreasonable amount of network bandwidth, but also would consume an unacceptable amount of processing resources for processing those metrics to generate a convergent view of the network topology.

To address the limitations of conventional routing protocols, network administrators sometimes implement additional optimizations to improve network performance. For example, a load-balancing or cost-minimizing procedure may be used in conjunction with traditional routing protocols to redistribute data flows entering or exiting a multi-homed routing domain or AS. These additional procedures may require the border nodes to collect various network statistics associated with the data flows. An exemplary software application that may be used to collect the network statistics at the border nodes is NetFlow™ by Cisco Systems, Incorporated, which is described in more detail in the technical paper entitled Netflow Services Solutions Guide, published September 2002, and is hereby incorporated by reference as though fully set forth herein.

According to the Netflow infrastructure, selected interfaces at one or more network nodes monitor incoming and outgoing data flows and collect various statistics for the monitored flows. The interfaces may include physical interfaces, such as a port on a network interface card, and/or logical interfaces, such as virtual private networks (VPN) implemented over multiple physical interfaces. Each node maintains at least one Netflow cache which stores address prefixes and statistics for the monitored data flows. The "raw" (i.e., unprocessed) address prefixes and measured statistics are periodically exported from the Netflow cache to a central management node (or "collector"). The central management node is configured to receive prefixes and statistics from a plurality of different network nodes. A Netflow record format that may be used to export the raw prefixes and statistics is described in the technical paper entitled *Netflow v9 Export Format*, which is hereby incorporated by reference in its entirety.

After the nodes' exported statistics are received at the central management node, a network administrator analyzes the collected data, e.g., either by manual inspection or using a software script, to determine whether the data flows may be more optimally distributed. For instance, suppose the administrator desires to make more efficient use of available network bandwidth and determines that a first network interface is underutilized and a second interface is oversubscribed. In this case, at least some data flows at the second interface may be redirected to the first interface. To effectuate such a routing change, the administrator may, for example, make static changes to the routing tables at the first and second interfaces or may re-assign local-preference values (or other priority values) associated with the data flows.

The above-noted route optimization procedures suffer various disadvantages. For instance, the central management node may collect an exorbitant amount of raw data that subsequently must be processed, e.g., by the network administrator. Thus, the amount of time and resources consumed collecting and processing the relatively large amounts of prefixes and statistics may be prohibitive. Furthermore, current optimization procedures do not respond quickly in response to "brown outs" (i.e., temporary network outages) or "blackouts" (i.e., permanent network outages) at the border nodes. Specifically, the response times are inherently limited by the latency of collecting network statistics at the border nodes, exporting the raw statistical data to the central management node and sorting and analyzing the received data at the central management node to identify changes in network traffic patterns.

It is therefore generally desirable to have a more efficient technique for optimizing routing operations at the edge of a multi-homed network or subnetwork. The technique should respond quickly to changes in network traffic and should be flexible and configurable for use in any autonomous system or routing domain.

SUMMARY OF THE INVENTION

The present invention overcomes the disadvantages of the prior art by providing an Optimized Edge Routing (OER) technique for efficiently routing data at the edge of a to network or subnetwork. The technique employs an OER Master node that manages a set of border nodes located at the edge of the network or subnetwork. Unlike prior implementations, the Master node instructs the border nodes to dynamically acquire ("learn") prefixes and statistics of incoming and outgoing data flows matching a predetermined set of learn-filter criteria. The border nodes forward these learned prefixes and statistics to the Master node. Preferably, the border nodes sort the learned prefixes and forward a subset of the sorted prefixes and statistics to the Master node. Because the Master node receives learned prefixes and statistics for a set of filtered data flows, the Master node does not consume time and resources collecting and processing large quantities of raw data, as conventionally done. Consequently, the Master node can distribute network traffic and utilize network bandwidth at the edge of the network or subnetwork quicker and more efficiently than in prior implementations.

Each border node may contain one or more "learn aggregation caches" in which learned address prefixes may be stored. The learn aggregation caches also may store, inter alia, network statistics associated with the learned prefixes. Such statistics may include, for example, packet-delay measurements, packet-loss measurements, packet-throughput measurements, reachability measurements, etc. Furthermore, the aggregation caches may be configured to combine network statistics for a plurality of data flows associated with the same address prefix. For example, suppose a learn aggregation cache is configured to store prefixes and data throughput measurements of outgoing data flows at a border node. Further assume that two outgoing flows having the same address prefix are monitored over a fixed time interval, e.g., 10 seconds, and the first flow contains 500 bytes and the second flow 600 bytes during that interval. In this case, a single entry in the aggregation cache may combine the two throughput measurements (1100 bytes) for the learned prefix.

In operation, the Master node may send messages to the border nodes specifying, among other things, a number of prefixes to learn, a time interval over which to learn them and a predetermined set of learn-filter criteria indicating which data flows to monitor and what type(s) of statistics to collect. After filtering data flows and learning prefixes for the specified time interval, each border node may process and/or sort the statistics stored in its learn aggregation caches in accordance with the predetermined set of criteria. Thereafter, the Master node's specified number N of learned prefixes may be forwarded to the Master node. Accordingly, for M border nodes, the Master node may is receive M*N prefixes which it then may further process and/or sort. The Master node optimizes network traffic patterns at the edge of the network or subnetwork based on its sorted list of learned prefixes.

Advantageously, the predetermined set of learn-filter criteria may be based on routing metrics other than, or in addition to, conventional cost-based or distance-based metrics. Further, the Master node has flexibility in configuring (or reconfiguring) the predetermined set of criteria from time to time. For instance, the Master node may dynamically select a set of learn-filter criteria specifying one or more packet-header fields, e.g., stored in the packets' internetwork, transport or application layer headers, that are used to filter data flows at the border nodes. It is also contemplated that, in addition to learning address prefixes and statistics of filtered data flows, the border nodes also may collect statistics for a set of known prefixes, e.g., predefined by a network administrator. The Master node may be a stand-alone network management node or may be incorporated into a network node, such as a border node.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 4 is a schematic block diagram of exemplary top-talker and top-delay aggregation caches that advantageously may be employed in the border node of FIG. 3;

DETAILED DESCRIPTION OF ILLUSTRATIVE EMBODIMENTS

Figure 1:
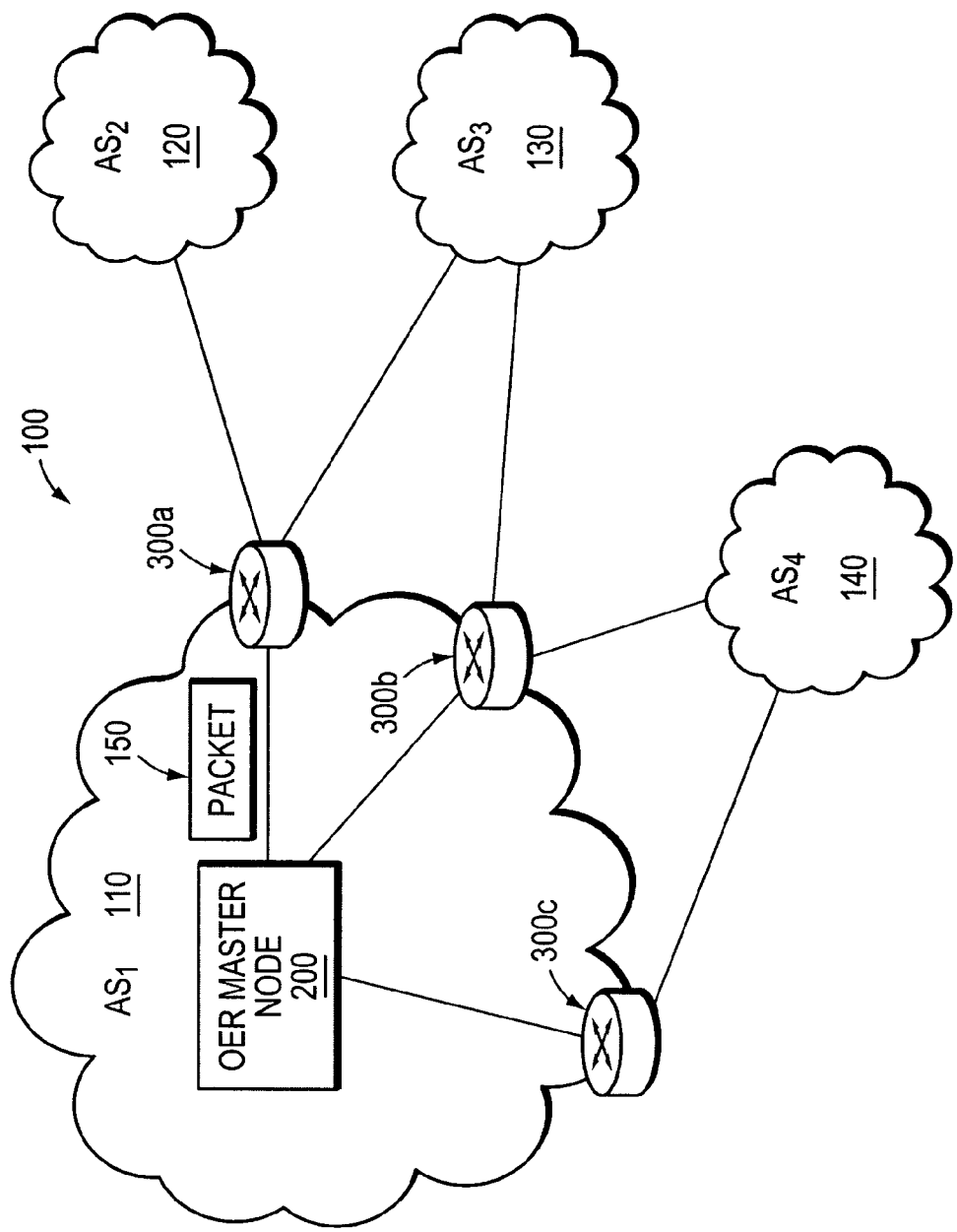
FIG. 1 is a schematic block diagram of an exemplary computer network that may be used to implement an illustrative embodiment of the invention.

FIG. 1 is a schematic block diagram of an exemplary computer network 100 comprising a multi-homed autonomous system 110 ($AS_1$) which is interconnected with a plurality of other autonomous systems 120, 130 and 140 ($AS_2$-$AS_4$). Illustratively, each $AS_1$-$AS_4$ is an autonomous system, although those skilled in the art will appreciate that the AS's 110-140 may be configured as routing domains or other networks or subnetworks. The autonomous system 110 includes one or more network nodes, including a set of border nodes 300a-c through which client communications, such as data flows, can pass into and out of the autonomous system. As shown, the border node 300a permits data packets 150 to be routed from $AS_1$ to $AS_2$ and $AS_3$. The border node 300b enables nodes in $AS_1$ to communicate with $AS_3$ and $AS_4$, and the node 300c is coupled to $AS_4$. Routing operations at the border nodes 300a-c may be managed by an optimized edge routing (OER) "Master" node 200. The Master node may be connected to the border nodes by, e.g., point-to-point links or a local area network.

Data packets may be communicated by the autonomous systems 110-140 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols, such as conventional link-state or distance-vector protocols. In addition, data packets containing network topology information may be exchanged among the autonomous systems 110-140 using "external" gateway protocols, such as the Border Gateway is Protocol (BGP).

Figure 2:
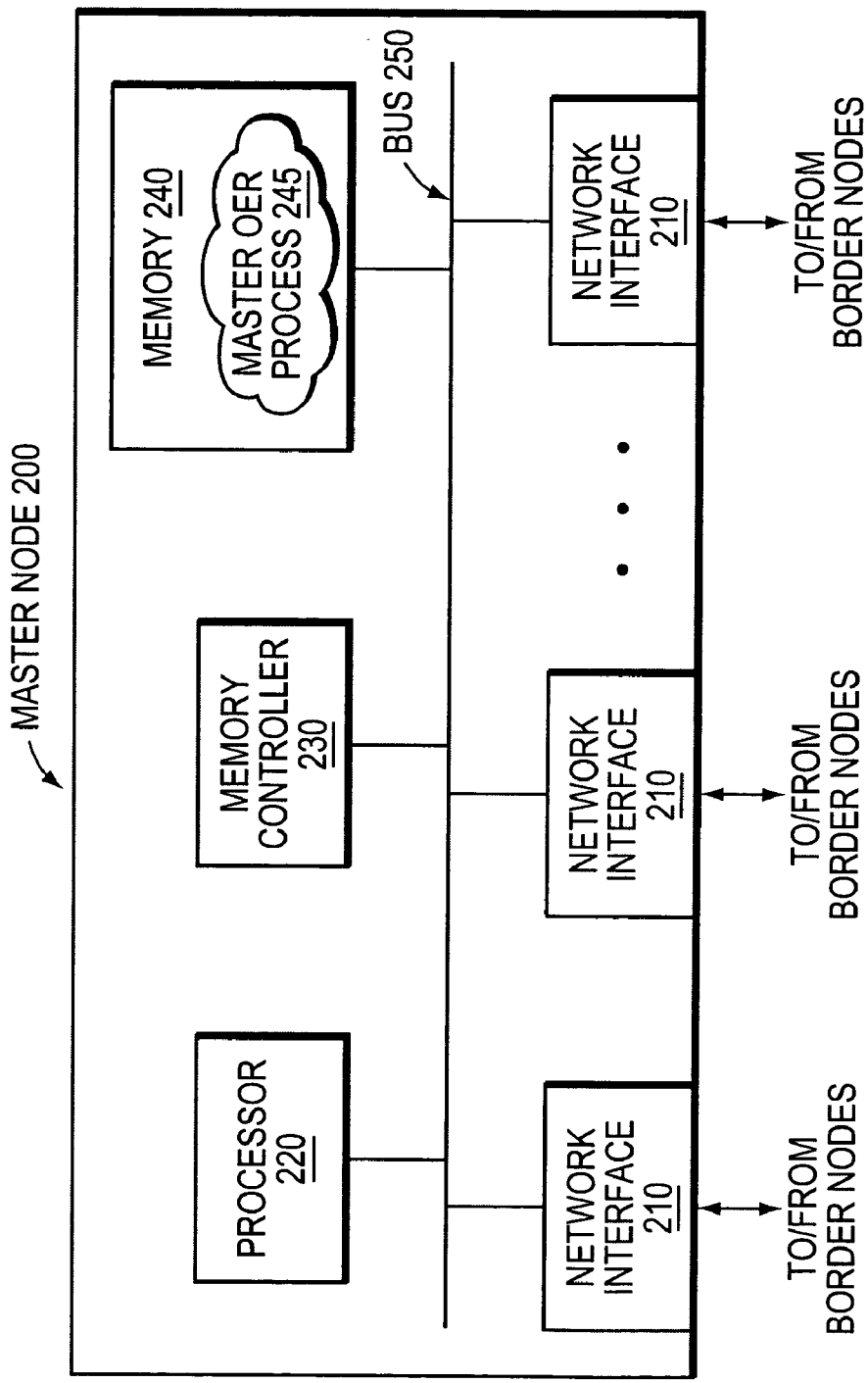
FIG. 2 is a schematic block diagram of an illustrative Master node which may be implemented in the exemplary computer network of FIG. 1.

FIG. 2 is a schematic block diagram of an exemplary Master node 200 that may be advantageously used with the present invention. The node comprises a plurality of network interfaces 210, a processor 220, a memory controller 230 and a memory 240 interconnected by a system bus 250. The network interfaces 210 contain the mechanical, electrical and signaling circuitry for communicating data over physical links coupled to the border nodes 300. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 via the memory controller 230. The memory comprises a form of random access memory (RAM) that is generally cleared by a power cycle or other reboot operation (e.g., it is a "volatile" memory). For instance, the memory 250 may comprise dynamic random access memory (DRAM) and/or synchronous DRAM (SDRAM) storage locations adapted to store program code and data structures. Accordingly, the memory 240 may store instructions that direct the processor 220 to implement a Master OER process 245. It will be apparent to those skilled in the art that the memory also may comprise other memory means, including various computer-readable media, for storing program instructions and data structures pertaining to the operation of the Master node 200.

In operation, the Master OER process 245 directs the processor 220 to generate a message which instructs at least one border node 300 to "learn" a set of address prefixes meeting a predetermined set of criteria. The message also may specify one or more known address prefixes for the border node(s) to monitor. The Master node 200 transmits this message over its network interfaces 210 to the appropriate border node(s). After receiving the request, a border node monitors data flows at the edge of the autonomous system 110 and dynamically acquires (learns) address prefixes satisfying the predetermined criteria. Preferably, the border node sorts the learned prefixes and selects a requested subset of the sorted prefixes. Then, the border node returns a response containing the selected address prefixes. The response may contain other information as well, such as network statistics corresponding to the returned prefixes. In addition, the response also may include the one or more known address prefixes specified by the Master node and their corresponding statistics.

Responses from a plurality of border nodes may be received at the Master node's network interfaces 210 and stored in its memory 240. The address prefixes and statistics contained in the received responses are then processed in accordance with the Master OER process 245. More specifically, the process 245 analyzes the prefixes and statistics and determines whether the distribution of data flows entering and/or leaving the autonomous system 110 can be optimized. If so, the Master OER process may redistribute data flows routed through the border nodes by, e.g., associating new BGP local-preference values with selected data flows or statically changing the contents the border nodes' routing tables.

Figure 3:
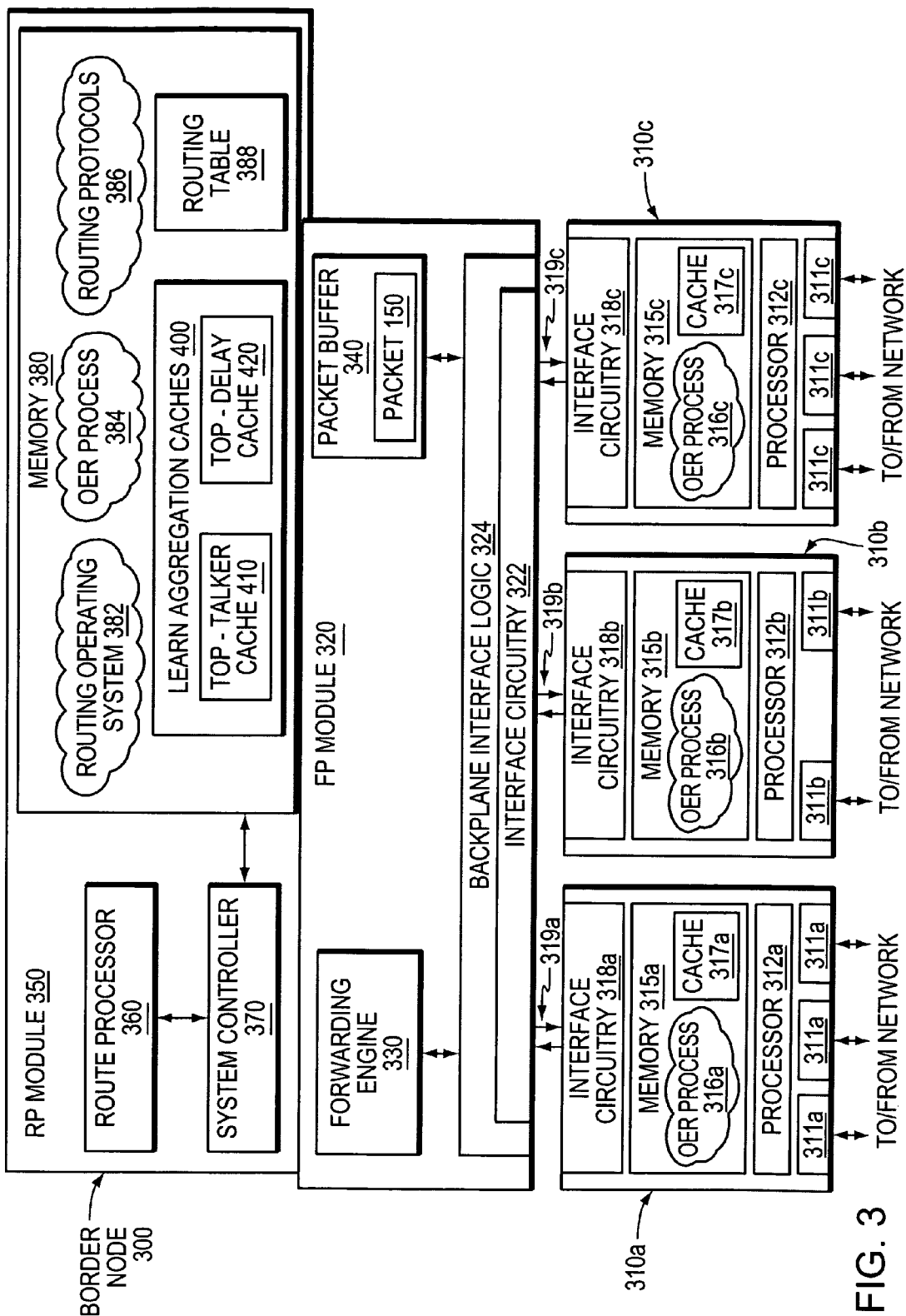
FIG. 3 is a schematic block diagram of an illustrative border node which may be implemented in the exemplary computer network of FIG. 1.

FIG. 3 is a schematic block diagram of an exemplary border node 300 that advantageously may be used with the present invention. The border node comprises a plurality of line cards 310, a forwarding processor (FP) module 320 and a route processor (RP) module 350. Each line card 310 is adapted to transmit and/or receive data packets in the network 100, and also may be adapted to process the incoming and outgoing data. To that end, each line card 310 comprises, among other things, at least one physical port 311, a processor 312, a memory 315 and interface circuitry 318. While the exemplary border node 300 contains the line cards 310a, 310b and 310c, those skilled in the art will appreciate that the node may contain any arbitrary number of line cards.

The line cards 310a-c are adapted to exchange data with other network nodes, such as the Master node 200, through their respective physical ports 311a-c. Because the border node 300, by definition, resides at the edge of an autonomous system, at least one to of the ports 311a-c is coupled to a border node in another, interconnected autonomous system. The physical ports may be used to transfer data using various communication protocols, including, inter alia, TCP/IP, UDP, ATM, SONET, wireless protocols, Frame Relay, Ethernet, FDDI, etc. The processors 312a-c may be configured to monitor and/or process data packets that are transmitted and received through the ports 311a-c. For instance, the processors may be configured to perform various routing and network management operations, such as learning address prefixes and collecting data-flow statistics in accordance with the present invention.

Each line card 310a-c contains an "on-board" memory 315a-c that is accessible to the line card's respective processor 312a-c. The memory may comprise a form of high-speed static RAM (SRAM) or DRAM adapted to store program code and data structures available to the processor. By way of example, consider the memory 315a on the line card 310a. The memory 315a may be configured to store a set of instructions for implementing an OER process 316a that is executable by the processor 312a. The memory 315a may be further configured to store a data cache 317a, such as a NetFlow cache, that can be populated by the OER process 316a. Similarly, the memories 315b,c respectively may store OER processes 316b,c and caches 317b,c available to the processors 312b,c. Of course, those skilled in the art will understand that each of the memories 315a-c may store additional information, such as authentication/authorization processes, routing processes, forwarding information bases, etc.

Operationally, the OER processes 316a-c monitor data packets 150 transmitted and received through the ports 311a-c and measure various network statistics associated with incoming and outgoing data flows. More specifically, each monitored packet may be classified as belonging to a particular data flow, e.g., based on the source and destination IP addresses and port numbers contained in the packet. If the packet is determined to belong to an unknown ("new") data flow, an entry is allocated in an appropriate local cache 317a-c for storing an address prefix and measured statistics associated with the new flow. Preferably, the address prefix of the flow's source node is stored in the allocated cache entry if the new flow is an inbound flow, i.e., entering the $AS_1$ 110. Otherwise, for an outbound flow, a destination address is stored in the cache entry. When a received packet is classified as belonging to a previously-identified data flow, the packet's measured statistics may be combined with statistics previously stored in the flow's cache entry.

Illustratively, the OER processes 316a-c may be configured to measure various types of network statistics for their monitored data flows. For example, the OER processes may measure data throughput, i.e., the amount of data transferred or received, for each of the monitored flows. Similarly, the OER processes 316a-c may measure round-trip packet delay times for each of the flows. Preferably, the round-trip delay times are measured based on latencies of establishing TCP sessions. Specifically, for each TCP/IP data flow, the OER processes may measure the latency between sending a TCP synchronize-sequence-number (SYN) packet and receiving a corresponding acknowledgement (ACK) packet. Alternatively, the OER processes 316a-c may employ other techniques for measuring the round-trip delay times, such as issuing conventional "echo" packets (or "ping" packets).

The line cards 310a-c may be coupled to a backplane logic circuit 324 by a plurality of high-speed unidirectional (i.e., point-to-point) links 319a-c. The backplane logic circuit is preferably embodied as a high performance application specific integrated circuit (ASIC) comprising an interface circuitry 322 coupled to the unidirectional links. Corresponding interface circuitry 318a-c, preferably embodied within a high performance ASIC resident on each of the line cards, couples the line cards to their respective unidirectional links 319a-c. The interface circuitry 318a-c generally converts conventional formats of data received at the line cards to a protocol format for transmission over the unidirectional links, and vice-versa.

Broadly stated, the functional infrastructure of the border node 300 is divided into a data plane and a control plane. The data plane includes components used to retrieve data packets from a network and, when necessary, provide forwarding decisions for those packets. To that end, the data plane extends from the line cards 310a-c to the unidirectional links 319a-c, through the links to the backplane interface logic 324, and through the backplane to a forwarding engine 330 (such as an array of one or more processors) in to the FP module 320. The forwarding engine essentially comprises the forwarding path functionality of the border node and may be implemented as microcoded hardware in the FP module. Data packets 150 are received at the line cards 310a-c and may be processed by the OER processes 316a-c before being forwarded to a packet buffer 340 in the FP module. The received packets may reside in the packet buffer while the forwarding engine 330 processes their associated packet headers. The processed headers are prepended to their respective data packets, and the resultant packets are transferred through the backplane to the line cards 310a-c which, in turn, transmit the packets over appropriate ports 311a-c.

The control plane, on the other hand, includes those entities used to manage/control operation of the border node 300 and extends from the backplane interface logic 324 to a route processor 360 on the RP module 350. Although not shown, a bus, such as a peripheral component interconnect (PCI) bus, couples the backplane logic on the FP module with a system controller 370 on the RP module. The route processor 360 is a general-purpose or special-purpose processor that is configured to perform management functions for the border node 300. For instance, the processor 360 may manage a set of routing information, e.g., stored in a routing table 388, which is used by the forwarding engine 330 for making forwarding determinations. To ensure that its routing information is up-to-date, the route processor may be configured to exchange network topology information with other network nodes, e.g., using conventional "interior" or "external" gateway routing protocols. Further, the route processor also may be configured to perform OER operations as set forth herein.

The route processor 360 is coupled to the system controller 370 and to a memory 380. The memory 380 may comprise DRAM, SDRAM, or other types of computer-readable media having storage locations which are addressable by the route processor and system controller. The memory 380 is configured to store, inter alia, program code for implementing a routing operation system 382, an OER process 384 and various routing protocols 386, and also may be configured to store data structures, such as a routing table 388 and one or more "learn aggregation" caches 400.

The routing operating system 382, portions of which are typically resident in the memory 380, is executed by the route processor 360 for performing control/management operations. One example of an operating system that may be stored in the memory 380 is the Internetworking Operating System (IOS™) of Cisco Systems, Incorporated. The operating system 382 functionally organizes the border node 300 by, e.g., invoking network is operations in support of software processes and services executing on the route processor 360. These services and processes may include various routing protocols 386, such as interior and external gateway protocols used to update routing information stored in the routing table 388. In addition, the services and processes supported by the operating system also may include an OER process 384 resident in the memory 380.

The OER process 384 is configured to receive a set of "filtered" address prefixes and statistics from each of the line-card OER processes 316a-c. Specifically, the OER processes 316a-c employ "learn filters" that are applied to the learned prefixes and statistics stored in their local caches 317a-c. Each learn filter is configured with a predetermined set of criteria that selects which learned prefixes and statistics should be forwarded to the OER process 384. Preferably, the learn filters' predetermined sets of criteria are dynamically configurable, e.g., by a remote network node such as the Master node 200. The learn filters may be implemented at individual ports 311a-c or may be implemented at a plurality of physical ports which collectively implements one or more logical interfaces, such as a virtual private network.

Each learn filter's predetermined set of criteria may be used to filter data flows whose data packets contain a known set of values in selected packet-header fields, e.g., in their internetwork, transport and application layer headers. Accordingly, the learn filter forwards address prefixes and statistics to the OER process 384 for those data flows containing the known set of packet-header values. The known set of packet-header values may include, e.g., source and destination IP addresses, source and destination port numbers, type-of-service (ToS) values, subnet mask lengths, protocol identifiers, source and destination AS identifiers, etc. More generally, the learn filters may filter data flows in the caches 317a-c based on any combination of packet-header field values. Here, it is noted that the known set of packet-header values may consist of individual packet-header values and/or predefined ranges of acceptable values. For instance, a learn filter may filter data flows having source or destination IP addresses within a predefined range of acceptable IP addresses. At least some of the learn filters also may be configured to filter data flows associated with a known set of address prefixes, e.g., specified by a remote Master node.

In addition to identifying which data flows to filter, each learn filter's predetermined set of criteria also indicates which network statistics to forward to the OER process 384. The statistics may correspond to various data-flow measurements, such as round-trip delay times, data throughput, packet loss, reachability, etc., obtained by the OER processes 316a-c. In general, the OER processes 316a-c may measure any arbitrary data-flow metric, including conventional cost-based and distance-based metrics. Further, the learn filter may calculate statistical averages, variances, medians, etc. of a collection of data-flow measurements stored in the caches 317a-c. The OER processes 316a-c may be configured to sort network statistics for a plurality of address prefixes and return only a subset of the sorted prefixes to the OER process 384. For instance, the statistics may be sorted in ascending or descending order.

Typically, the line-card OER processes 316a-c dynamically acquire data-flow prefixes and statistics for the duration of a predetermined "learning interval," e.g., specified by the Master OER process 245. After the learning interval expires, the address prefixes and statistics stored in the caches 317a-c are filtered by the OER processes' learn-filter criteria and the filtered prefixes and statistics are forwarded to the OER process 384. Although most prefixes and statistics are forwarded to the OER process 384 after the learning interval expires, some prefixes and statistics may be forwarded during the learning interval. More specifically, each line-card data cache 317a-c may employ an aging mechanism to ensure that it does not become saturated with out-dated information. During the learning interval, the OER processes 316a-c may forward prefixes and statistics whose corresponding cache entries have "aged."

In an illustrative embodiment, each filtered prefix may be associated with a "why-learnt" indicator whose value indicates the reason the prefix was selected by the learn-filter criteria. For example, suppose the learn-filter criteria is configured to filter data flows based on different sets of criteria when identifying high-throughput data flows and data flows having large round-trip delay times. Accordingly, the line-card processes 316a-c may associate a first why-learnt indicator value with prefixes whose data flows match the high-throughput criteria. Likewise, the processes 316a-c may associate a second why-learnt indicator value with prefixes whose data flows match the round-trip delay criteria. Notably, a prefix may be associated with both the first and second why-learnt indicator values if its corresponding data flow satisfies both the high-throughput and round-trip delay sets of learn-filter criteria.

The OER process 384 receives the filtered address prefixes and statistics from the line-card OER processes 316a-c and stores each received prefix in an appropriate learn-aggregation cache 400, e.g., selected based on the prefix's associated why-learnt indicator value. As shown, the OER process 384 maintains a "top-talker" aggregation cache 410 and a "top-delay" aggregation cache 420. The top-talker cache 410 maps address prefixes with their corresponding data-throughput statistics; the top-delay cache 420 maps address prefixes with their corresponding round-trip delay statistics. Operationally, the OER process 384 may determine to store a prefix and its statistics in the top-talker cache 410 if the prefix is associated with a first why-learnt indicator value, and may store the prefix and statistics in the top-delay cache 420 if the prefix is associated with a second why-learnt indicator value. Those skilled in the art will appreciate that the memory 380 may store other learn aggregation caches (not shown) that may be associated with other types of network statistics (and other why-learnt indicator values). In each aggregation cache 400, the OER process 384 "aggregates" statistics for a plurality of data flows associated with the same address prefix.

FIG. 4 illustrates an exemplary top-talker learn aggregation cache 410 and an exemplary top-delay learn aggregation cache 420 that may be used in accordance with the illustrative embodiments. Each entry in the top-talker cache 410 stores an address prefix 412, a flow identifier (ID) 414, a measured data throughput 416, a flow count 418, and other network statistics 419. Similarly, the top-delay cache 420 includes entries storing a an address prefix 422, a flow ID 424, a measured round-trip delay time 426, a flow count 428, and other network statistics 429. The prefixes 412 and 422 store address prefixes filtered by the line-card OER processes 316a-c.

Each flow ID value 414 and 424 uniquely identifies a set of data flows, or a "virtual" data flow, having the same address prefix value 412 or 422. For simplicity, the flow ID values shown are sequential integer values in each of the learn aggregation caches 410 and 420. However, the flow ID values may be derived in other ways. For instance, each flow ID value may be generated as the concatenation of one or more packet-header values ("keys") which were used by the learn filters to select which data flows to forward to the OER process 384.

The measured data throughput 416 and measured round-trip delay times 426 store accumulated measurements for one or more data flows having the same address prefix. The flow counts 418 and 428 store the number of data flows whose measurements have been accumulated. Thus, every time the OER process 384 receives a new set of throughput and round-trip delay measurements for a learned address prefix, the measurements are added to the prefix's accumulated measurement totals 416 and 426, and the prefix's flow count values 418 and 428 are each incremented by one.

For instance, consider the address prefix 1.2.5.6 /26 in the aggregation caches 410 and 420. As shown, the OER process 384 has received throughput and round-trip delay measurements for five different data flows having this address prefix; the total data throughput for these five data flows equals 600 bytes and the total round-trip delay time equals 0.87 seconds. Advantageously, the OER process 384 can calculate an average throughput measurement and an average round-trip delay time for the prefix 1.2.5.6 /26 by dividing its accumulated measurement values 416 and 428 by their corresponding flow count values 418 and 428. The prefixes stored in the aggregation caches 410 and 420 then may be sorted based on these calculated average measurement values. After sorting the prefixes in the aggregation caches, the OER process 384 may export a predetermined number N of sorted prefixes and statistics to the Master OER process 245. The Master OER process may be executing in a remote network node, such as the Master node 200, or alternatively may be executing locally in the RP module 350.

The other statistics 419 and 429 may be used to store other information related to the aggregated data flows. For instance, the statistics 419 and 429 may include source or destination TCP port numbers, IP addresses, etc. associated with an address prefix 412 or 422. Here, it is noted that entries in the learn aggregation caches 410 and 420 may be aged using a conventional aging mechanism, such as a least-recently used algorithm. Further, the learn aggregation caches also may be "flushed" from time to time, i.e., and their contents erased or reinitialized.

As described, the illustrative border node 300 operates in a "distributed" mode, where each line card 310a-c executes a local OER process 316a-c in communication with a centralized OER process 384 executing in the RP module 350. As such, the centralized OER process 384 may be viewed as having been distributed among the line cards. However, when the border node 300 operates in a "non-distributed" mode, the line cards 310a-c are not configured with local instances of the OER process 384. That is, only a single OER process 384 executes in the border node 300.

In a non-distributed embodiment of the border node 300, the contents of the line-card caches 317a-c may be combined into a single data cache (not shown), e.g., stored in the memory 380. For example, this combined data cache may be organized as a "main" NetFlow cache, in which every monitored address prefix and network statistic is recorded. The OER process 384 may apply a single learn filter to the contents of the main cache, e.g., using a predetermined set of criteria received from the Master OER process 245. The filtered address prefixes and statistics are then used to populate the learn aggregation caches 400, such as the top-talker cache 410 and the top-delay cache 420. Like in the distributed mode, the OER process 384 may sort the data stored in the aggregation caches 410 and 420 and forward a predetermined number N of sorted prefixes and statistics from these learn aggregation caches to the Master OER process.

The Master OER process 245 may send messages to the border nodes 300 specifying, among other things, a number of prefixes to learn, a time interval over which to learn them and a predetermined set of criteria which may be used to configure one or more learn filters at the border nodes' physical and logical network interfaces. The OER processes 384 executing in the border nodes send responses to the Master OER process including a set of prefixes satisfying the predetermined set of criteria. This request-response interchange may be repeated asynchronously, periodically or substantially continuously, i.e., where the periodical interval is relatively short. When the Master OER process 245 is executing in a remote Master node 200, the border nodes 300 preferably exchange request and response messages with the Master node using a connectionless protocol, such as the UDP protocol.

Figure 5:
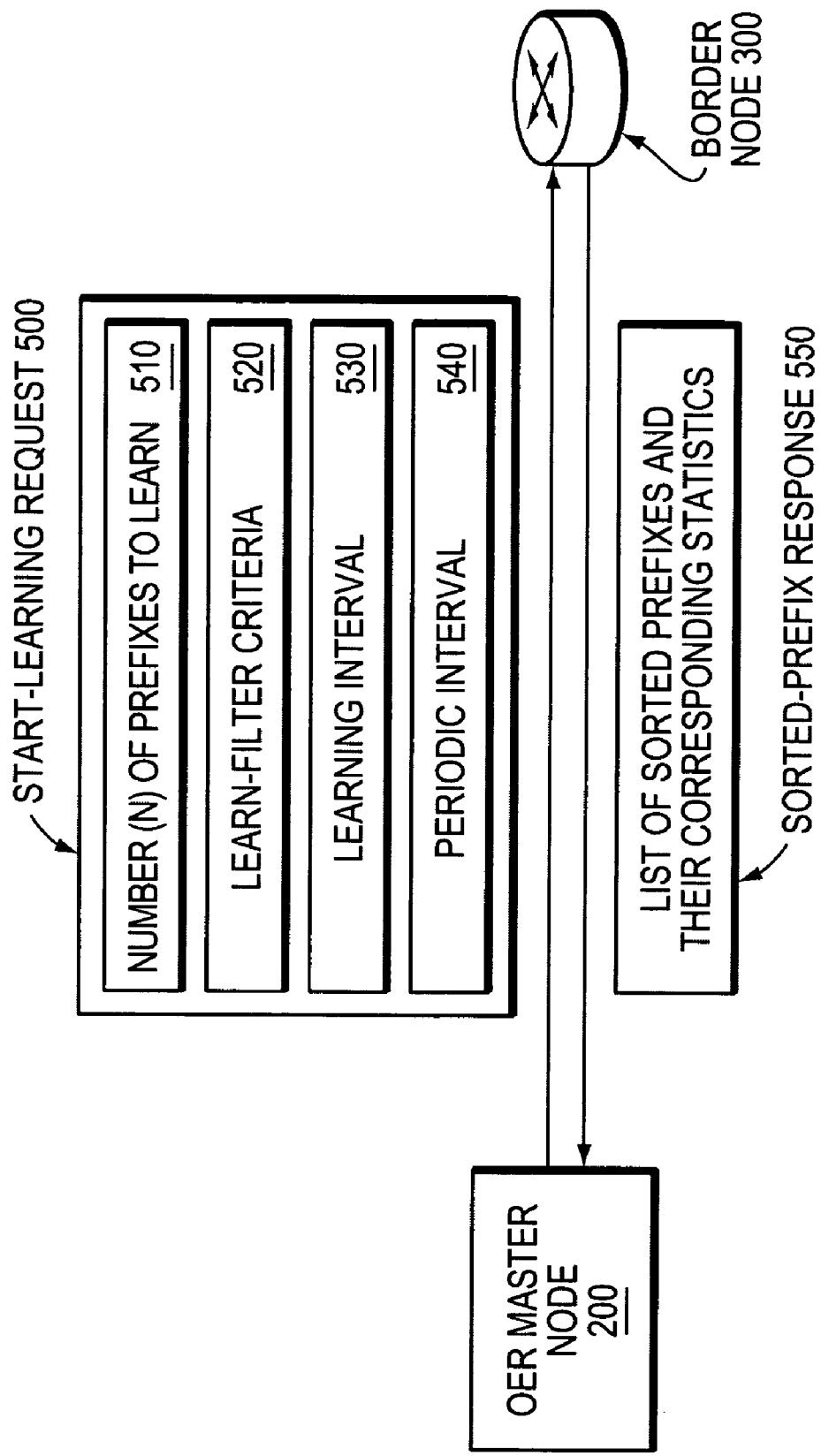
FIG. 5 is a schematic block diagram of an exemplary request-response interchange is between the Master node and a representative border node.

FIG. 5 illustrates an exemplary request-response interchange between the Master node 200 and a representative border node 300. The Master node sends a "start-learning" request 500 to the border node to initiate the exchange. The request includes, among other things, a specified number (N) of address prefixes to learn 510, a predetermined set of learn-filter criteria 520, a learning interval 530 and a periodic interval 540. In addition, the request also may include other information (not shown), such as a list of known address prefixes to monitor. The request 500 is preferably transmitted to the border node 300 as a UDP datagram.

The predetermined set of learn-filter criteria 520 may be used to configure one or more learn filters at selected network interfaces at the border node 300. Accordingly, the learn-filter criteria may specify which network interfaces to monitor, which data flows to filter at the selected interfaces and what type of statistics to collect for the monitored data flows. The learn-filter criteria's selected interfaces may include both physical ports and/or logical network interfaces. In general, the learn-filter criteria may be configured to filter incoming and/or outgoing data flows at the selected interfaces based on an arbitrary set of filtering parameters. For instance, the learn-filter criteria may specify that only incoming or outgoing flows are monitored. Or, the criteria may filter data flows based on a known set of values stored in selected packet-header fields, e.g., in the internetwork, transport and application layer headers.

The network statistics specified by the learn-filter criteria 520 may be based on any arbitrary data-flow measurements, such as data throughput, round-trip delay time, packet loss, variation in delay times among a plurality of data flows, variation in data throughput among a plurality of data flows, reachability metrics, etc. In addition to indicating which type of statistics to collect, the learn-filter criteria also may specify how a collection of learned statistics should be sorted and/or processed at the border node 300. For instance, the criteria may indicate that the requested statistics should be sorted in ascending or descending order. In this way, the border node can identify address prefixes corresponding to the top N sorted statistics, and generate a list of sorted prefixes and statistics that may be returned to the Master node 200.

The learning interval 530 indicates a duration of time, e.g., in seconds, for which the border node 300 dynamically acquires address prefixes and statistics using the learn-filter criteria 520. The learning interval is configurable by the Master node 200. The periodic interval 540 indicates a duration of time between successive learning intervals. In other words, the Master node may configure the border node 300 to periodically learn address prefixes and statistics which may be returned to the Master node. For instance, consider a start-learning request 500 that specifies a learning interval equal to 10 seconds and a periodic interval equal to 50 seconds. In this case, data flows are monitored at the border node for 10 seconds, then the border node waits 50 seconds before commencing another 10 second learning interval, and so on. When the periodic interval is substantially small (or equal to a predetermined null value), the border node 300 may be configured to continuously monitor data flows and learn address prefixes in accordance with the learn-filter criteria 520. In such a situation, the border node still may return requested prefixes to the Master node 200 after every learning interval 530 elapses.

The border node 300 returns its list of N sorted prefixes and their corresponding statistics in a "sorted-prefix" response 550. In addition, each prefix's associated why-learnt indicator value also may be forwarded to the Master node 200. The sorted-prefix response is preferably transmitted to the Master node as a UDP datagram whose payload is formatted in accordance with the NetFlow Version 9 export format. In response to receiving the response 550, the Master node may adjust routing operations at the border node 300. To that end, the Master node may redistribute selected incoming and outgoing data flows at the border node, e.g., by modifying the BGP local-preference values of the flows or modifying the contents of the border node's routing table 388.

Figure 6:
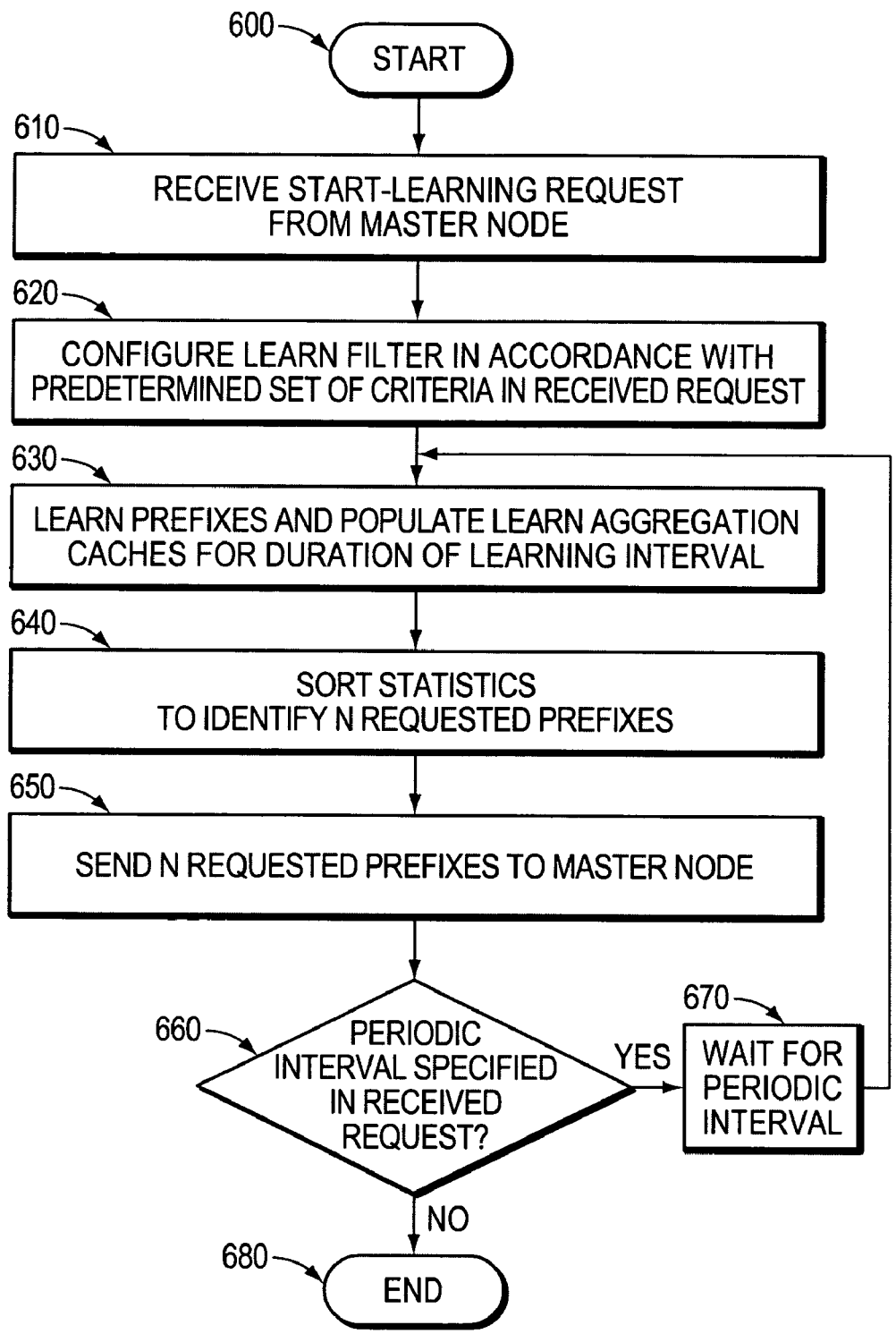
FIG. 6 is a flowchart illustrating a sequence of steps for a border node to automatically learn address prefixes and statistics in accordance with the illustrative embodiments.

FIG. 6 is a flowchart illustrating a sequence of steps for a border node to automatically learn address prefixes and statistics in accordance with the illustrative embodiments. The sequence begins at step 600 and proceeds to step 610 where a border node receives a start-learning request 500 from an OER Master process 245, e.g., executing in a remote Master node 200. The start-learning request 500 includes a number (N) of requested prefixes 510, a predetermined set of learn-filter criteria 520 and a learning interval 530 and may also include a periodic interval 540. At step 620, one or more OER processes in the border node configure their respective learn filters in accordance with the predetermined set of learn-filter criteria 520. Illustratively, a distributed set of OER processes 316a-c may configure separate learn filters at selected network interfaces in the border node.

Next, at step 630, the border node monitors incoming and outgoing data flows for the duration of the learning interval 530 and dynamically acquires (learns) address prefixes and statistics for data flows that satisfy the predetermined set of learn-filter criteria 520. Each learned prefix may be associated with a why-learnt indicator whose value indicates the reason the prefix was selected by the learn-filter criteria. The filtered prefixes and statistics then may be stored and aggregated in an appropriate learn aggregation cache 400, such as a top-talker cache 410 and a top-delay cache 420. Illustratively, the aggregation cache for a prefix is selected based on the prefix's associated why-learnt indicator value. For example, a prefix whose associated why-learnt indicator corresponds to a data-throughput measurement may be stored in the top-talker cache 410.

The contents of the aggregation caches 410 and 420 may be processed, e.g., to calculate average throughput measurements or average round-trip delay times, and subsequently sorted, e.g., in ascending or descending order, at step 640. Then, at step 650, the border node prepares a response 550 containing the requested number 510 of sorted address prefixes and statistics. The response also may contain the prefixes' associated why-learnt indicator values. The response 550 is forwarded to the Master OER process 245. At step 660, the border node determines whether a periodic interval was specified in the received request 500. If so, then at step 670 the border node waits for the periodic interval to expire and then the sequence returns to step 630. Otherwise, the sequence ends at step 680.

Figure 7:
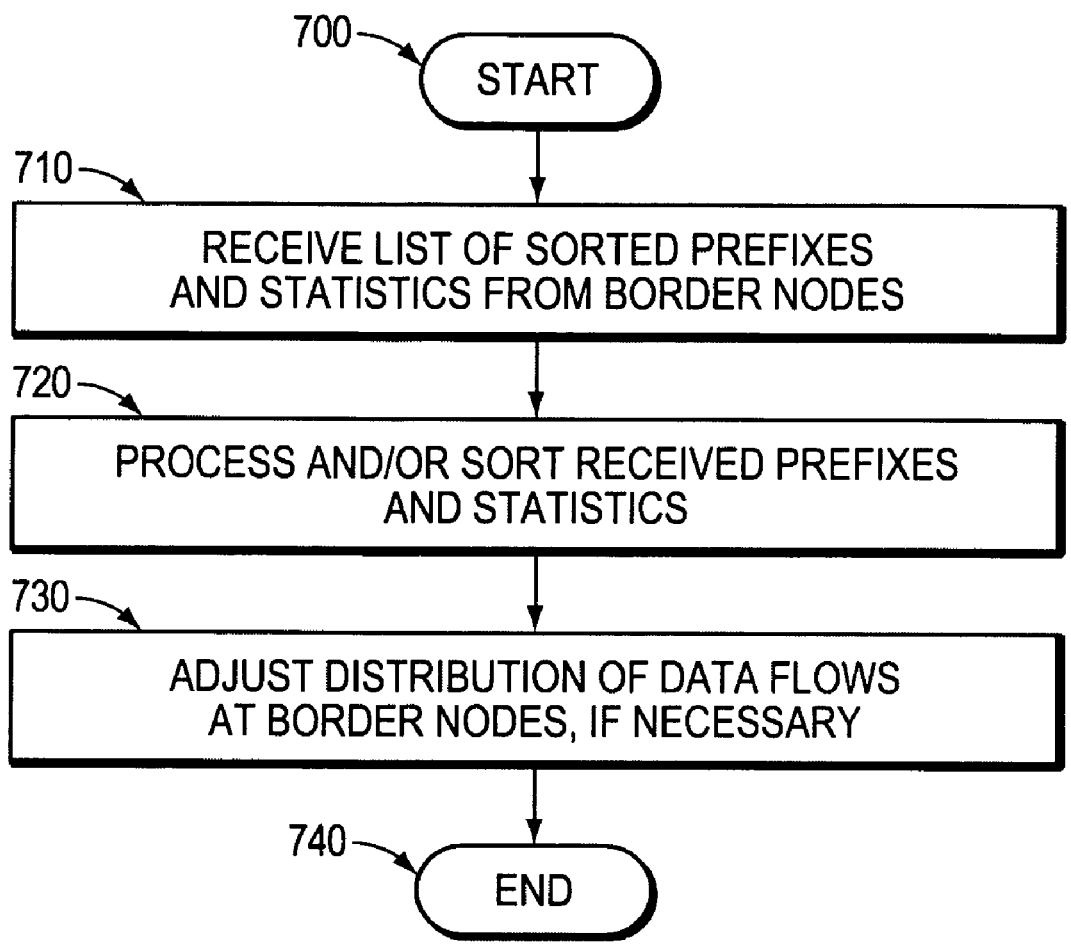
FIG. 7 is a flowchart illustrating a sequence of steps that may be performed by a Master OER process that receives address prefixes from a plurality of border nodes, as set forth in the illustrative embodiments.

FIG. 7 illustrates a flowchart comprising a sequence of steps that may be performed by the Master OER process 245 after receiving sorted address prefixes and statistics from a plurality of border nodes 300. The sequence starts at step 700 and proceeds to step 710 where one or more lists of sorted prefixes and statistics are received from the border nodes. Notably, the lists also may contain other information related to the sorted prefixes, such as the prefixes' respective why-learnt indicator values. At step 720, the Master OER process may further process and/or sort the received prefixes and statistics. By way of example, assume that each of the M border nodes forwards a set of N address prefixes and corresponding average throughput measurements to the Master OER process. Further assume that each border node has sorted the prefixes in order of descending average throughput value (i.e., the sorted prefixes correspond to the "most active" data flows monitored by the border nodes). The Master OER process therefore receives N*M prefixes that it may further sort to determine the most-active prefixes across all M border nodes. Based on the contents of its sorted list of prefixes and average data-throughput values, the Master OER process 245 may adjust distribution of data flows at the border nodes, if necessary, at step 730. The sequence ends at step 740.

The foregoing has been a detailed description of illustrative embodiments of the invention. Various modifications and additions can be made without departing from the spirit and scope of the invention. For example, although a plurality of learn filters in a border node may be configured with the same predetermined set of criteria 520, it is also expressly contemplated that one or more of the learn filters may be configured with different sets of criteria. Similarly, the number of address prefixes 510, the learning intervals 530 and the periodic intervals 540 may differ among a plurality of learn filters. Also, while the illustrative Master node 200 may communicate a start-learning request 500 to an individual border node 300, it is also contemplated that the Master node may broadcast the request 500 to a plurality of border nodes within its autonomous system, e.g., using various multicast techniques known in the art. In addition, the Master OER process 234 may be distributed among a plurality of nodes, and thus need not reside in a single Master node 200.

It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A Master node interconnected with one or more border nodes located at an edge of a computer network, the Master node comprising:
   a processor,
   a memory storing instructions which are executable by the processor, at least a portion of the instructions for implementing an optimized edge routing (OER) process configured to:
   generate a message that instructs at least one of the border nodes to dynamically acquire ("learn") address prefixes of a plurality of data flows entering or exiting the network through the border nodes, the learned address prefixes corresponding to data flows matching a predetermined set of criteria that specify a known set of packet-header field values; and,
   receive the learned address prefixes matching the predetermined set of criteria that specify a known set of packet-header values at the Master node from the at least one of the border nodes.

2. The Master node wherein the OER process is further configured to:
   adjust routing operations at the border nodes based on which learned address prefixes are received.

3. The Master node of claim 1, wherein the predetermined set of criteria also specifies a type of data-flow statistic to measure for each learned address prefix.

4. The Master node of claim 3, wherein the data-flow statistic is based on a data throughput measurement.

5. The Master node of claim 3, wherein the data-flow statistic is based on a roundtrip delay time measurement.

6. The Master node of claim 3, wherein the data-flow statistic is based on a packet loss measurement.

7. The Master node of claim 1, wherein the message includes the predetermined set of criteria, a learning interval indicating a duration of time for which the at least one border node learns address prefixes and a periodic interval indicating a duration of time between successive learning intervals.

8. The Master node of claim 7, wherein the message further includes a periodic interval indicating duration of time between successive learning intervals.

9. The Master node of claim 1, the message further includes at least one why-learnt indicator value associated with a corresponding learned address prefix, the why learnt indicator value indicating a reason its corresponding learned address prefix was filtered by the predetermined set of criteria.

10. The Master node of claim 1, wherein the computer network is an autonomous system.

11. A border node located at an edge of a computer network, the border node being in communication with a Master optimized edge routing (OER) process executing in the computer network, the border node comprising:
   a processor;
   one or more line cards adapted to send and receive data packets to the Master OER process; and
   a memory adapted to store instructions which are executable by the processor, at least a portion of the instructions for implementing an OER process configured to:
      dynamically acquire ("learn") address prefixes of a source or a destination of a plurality of data flows received at the line cards;
      selectively filter the learned address prefixes so as to identify a set of learned address prefixes whose corresponding data flows match a predetermined set of criteria that specify a known set of packet-header field values; and
      forward the filtered set of learned address prefixes to the Master OER process.

12. The border node of claim 11, wherein the Master OER process executes in a Master node located in the computer network.

13. The border node of claim 11, wherein the OER process executing in the border node is distributed on one or more of the line cards.

14. The border node of claim 11, wherein the OER process executing in the border node is further configured to associate at least one why-learnt indicator value with a corresponding learned address prefix, the why-learnt indicator value indicating a reason its corresponding learned address prefix was filtered by the predetermined set of criteria.

15. The border node of claim 11, wherein the OER process executing in the border node is further configured to:
   measure network statistics associated with the plurality of data flows; and
   aggregate measured statistics for those data flows that were (i) selectively filtered using the predetermined set of criteria and (ii) have the same address prefix.

16. The border node of claim 15, wherein the OER process executing in the border node is further configured to:
   sort the aggregated statistics and generate a list of sorted learned prefixes; and
   forward the list of sorted learned prefixes to the Master OER process.

17. The Master node of claim 11, wherein the computer network is an autonomous system.

18. An autonomous system, comprising:
   one or more border nodes situated at the edge of the autonomous system, each border node being adapted to dynamically acquire ("learn") address prefixes of a plurality of data flows entering or exiting the autonomous system through the border nodes, and further adapted to selectively filter the learned address prefixes so as to identify a set of learned address prefixes whose corresponding data flows match a predetermined set of criteria that specify a known set of packet-header field values; and
   a Master node adapted to receive the set of learned address prefixes identified by the border nodes and to control distribution of data flows at the border nodes based on the set of learned address prefixes.

19. The autonomous system of claim 18, wherein the Master node is one of the border nodes.

20. The autonomous system of claim 18, wherein the Master node disseminates the predetermined set of criteria to the border nodes.

21. The autonomous system of claim 18, wherein the Master node multicasts a start learning request containing the predetermined set of criteria.

22. The autonomous system of claim 18, wherein the border nodes sort the filtered set of prefixes based on measured statistics associated with the filtered set of prefixes.

23. The autonomous system of claim 22, wherein the prefixes are sorted based on aggregated data throughput measurements associated with the filtered set of prefixes.

24. The autonomous system of claim 22, wherein the prefixes are sorted based on aggregated round-trip packet delay measurements associated with the filtered set of prefixes.

25. A method for a Master node in an autonomous system to optimize routing operations at one or more border nodes situated at the edge of the autonomous system, the method comprising:
   generating a message containing a predetermined set of criteria at the Master node, the predetermined set of criteria to include a set of one or more packet-header field values;
   forwarding the message from the Master node to a border node to instruct the border node to configure a learn filter using the predetermined set of criteria that include a set of one or more packet-header field values; and
   receiving at the Master node a set of learned address prefixes of a source or a destination of a plurality of data flows entering or exiting the network through the border node that were dynamically acquired ("learned") at the border node.

26. The method of claim 25, further comprising:
   adjusting routing operations at the one or more border nodes based on the contents of the received set of learned address prefixes.

27. A method for a border node located at an edge of an autonomous system to optimize its routing operations, the border node being in communication with a Master optimized edge routing (OER) process executing in the autonomous system, the method comprising:
   receiving a message containing a predetermined set of criteria that include a set of one or more packet-header field values and a learning interval,
   configuring, in response to receiving the message, at least one learn filter using the predetermined set of criteria that include a set of one or more packet-header field values;
   dynamically acquiring ("learning") address prefixes of a plurality of data flows, and statistics for the plurality of data flows for the duration of the learning interval, and
   filtering learned address prefixes using the learn filter.

28. The method of claim 27, further comprising:
   aggregating statistics associated with each filtered address prefix, and
   sorting the filtered address prefixes based on their aggregated statistics.

29. The method of claim 27, further comprising:
   forwarding a set of sorted address prefixes to the Master OER process.

30. The method of claim 27, further comprising:
   waiting a duration of a periodic interval before learning new address prefixes and statistics.

* * * * *

UNITED STATES PATENT AND TRADEMARK OFFICE
CERTIFICATE OF CORRECTION

PATENT NO.         : 8,073,968 B1                             Page 1 of 1
APPLICATION NO.    : 10/980550
DATED              : December 6, 2011
INVENTOR(S)        : Shah It is certified that error appears in the above-identified patent and that said Letters Patent is hereby corrected as shown below:

Col. 7, line 37-38: "protocols, such as the Border Gateway is Protocol (BGP)."

Signed and Sealed this
Seventeenth Day of April, 2012

David J. Kappos
*Director of the United States Patent and Trademark Office*